(12) United States Patent
Al-Mufti et al.

(10) Patent No.: US 11,388,606 B2
(45) Date of Patent: Jul. 12, 2022

(54) METHODS AND SYSTEMS FOR ENVIRONMENTAL SENSING CAPABILITY PLANNING IN A SHARED SPECTRA

(71) Applicant: CommScope Technologies LLC, Hickory, NC (US)

(72) Inventors: Khalid W. Al-Mufti, Sterling, VA (US); Ariful Hannan, Sterling, VA (US); Olivani Subbukutty, Chantilly, VA (US); Navin Srinivasan, Fairfax, VA (US); Mayowa Aregbesola, Herndon, VA (US); Suryanarayana A. Kalenahalli, Chantilly, VA (US); Raina Rahman, Herndon, VA (US)

(73) Assignee: CommScope Technologies LLC, Hickory, NC (US)

( * ) Notice: Subject to any disclaimer, the term of this patent is extended or adjusted under 35 U.S.C. 154(b) by 112 days.

(21) Appl. No.: 16/900,427

(22) Filed: Jun. 12, 2020

(65) Prior Publication Data
US 2021/0022005 A1 Jan. 21, 2021

Related U.S. Application Data

(60) Provisional application No. 62/875,746, filed on Jul. 18, 2019.

(51) Int. Cl.
*H04W 16/14* (2009.01)
*H04W 16/18* (2009.01)
(Continued)

(52) U.S. Cl.
CPC ............. *H04W 16/14* (2013.01); *G01S 7/021* (2013.01); *H04W 16/18* (2013.01); *H04W 24/02* (2013.01); *H04W 24/08* (2013.01)

(58) Field of Classification Search
CPC ..... H04W 16/14; H04W 16/02; H04W 16/18; H04W 24/02; H04W 24/08; H04W 16/00; H04W 72/082; H04W 72/045; G01S 7/021
See application file for complete search history.

(56) References Cited

U.S. PATENT DOCUMENTS 9,699,663 B1 *  7/2017 Jovancevic ....... H04W 72/0453
10,477,491 B2 * 11/2019 Mueck ................ H04W 52/146
(Continued)

FOREIGN PATENT DOCUMENTS

CA  3071000 A1 * 11/2020 ........... H04L 9/0875
CN  107071879 B  *  1/2021 ........... H04W 16/14
(Continued)

OTHER PUBLICATIONS

Wireless Innovation Forum, "Requirements for Commercial Operation in the U.S. 3550-3700 MHz Citizens Broadband Radio Service Band", WINNF-TS-0112, Version V1.4.1, Jan. 16, 2018, pp. 1 through 77, The Software Defined Radio Forum Inc.

*Primary Examiner* — Matthew C Sams
(74) *Attorney, Agent, or Firm* — Fogg & Powers LLC

(57) ABSTRACT

Techniques for planning locations of receiver systems for an environmental sensing capabilities (ESC) system are provided. An ESC system is used to detect activity of primary users in shared spectra. The techniques can be used to reduce dead zone area(s), created by the receiver systems, for radios of secondary systems using the shared frequency spectrum.

6 Claims, 8 Drawing Sheets

(51) Int. Cl.
  *G01S 7/02*   (2006.01)
  *H04W 24/08*  (2009.01)
  *H04W 24/02*  (2009.01)

(56) References Cited

U.S. PATENT DOCUMENTS

| | | | |
|---|---|---|---|
| 10,630,377 B2 * | 4/2020 | Cheng | H04W 52/242 |
| 10,674,408 B2 * | 6/2020 | Hannan | H04W 28/20 |
| 2007/0064784 A1 | 3/2007 | Dehghan et al. | |
| 2017/0195887 A1 * | 7/2017 | Jovancevic | H04W 72/0446 |
| 2017/0295497 A1 | 10/2017 | Macmullan et al. | |
| 2017/0332243 A1 | 11/2017 | Macmullan et al. | |
| 2019/0028182 A1 * | 1/2019 | Smyth | H04W 24/08 |
| 2019/0120969 A1 * | 4/2019 | Hamzeh | H04J 11/0073 |
| 2019/0141713 A1 * | 5/2019 | Cimpu | H04W 72/082 |
| 2019/0174359 A1 * | 6/2019 | Hannan | H04W 16/14 |
| 2019/0215058 A1 * | 7/2019 | Smyth | H04B 7/18502 |
| 2019/0357155 A1 * | 11/2019 | Al-Mufti | H04W 52/42 |
| 2020/0059931 A1 * | 2/2020 | Hannan | H04W 72/0453 |
| 2020/0275288 A1 * | 8/2020 | Beck | H04W 52/242 |
| 2021/0385664 A1 * | 12/2021 | Nguyen | H04W 72/0453 |

FOREIGN PATENT DOCUMENTS

| | | | | |
|---|---|---|---|---|
| EP | 3849229 A1 * | 7/2021 | | H04W 72/08 |
| WO | WO-2019083612 A1 * | 5/2019 | | H04B 17/3911 |
| WO | WO-2020202829 A1 * | 10/2020 | | |

* cited by examiner

METHODS AND SYSTEMS FOR ENVIRONMENTAL SENSING CAPABILITY PLANNING IN A SHARED SPECTRA

CROSS-REFERENCE TO RELATED APPLICATIONS

The present application claims benefit of U.S. Patent Application Ser. No. 62/875,746 filed Jul. 18, 2019; the entire contents of the aforementioned patent application is incorporated herein by reference as if set forth in its entirety.

BACKGROUND

Shared spectra systems include primary users of the shared spectra and secondary users of the shared spectra. Primary users have priority access to the spectra shared with the secondary users. If a primary user requires access to shared spectra, all or some of the secondary users, e.g., proximate to the primary user, must cease operation or reduce transmission power so that aggregate interference in the shared spectra at the primary user is not greater than a threshold level.

Some primary users, e.g., radar on naval ships, do not provide notification of operation to the system(s) that control access to the shared spectra by the secondary system(s) or to the secondary users. Regions where primary users may be located are referred to as protection regions (which may be otherwise described as protection areas). As a result, an environmental sensing capability (ESC) (or ESC system) may be deployed proximate to protection regions(s), e.g., dynamic protection area(s) (DPA(s)), where primary users may operate. The ESC system detects operation, e.g., transmission, of a primary user in a protection region, and communicates such operation of the primary user to the system that controls the secondary system(s).

The ESC system comprises one or more receiver systems distributed in or adjacent to the protection region(s). The receiver system(s) may be, for example, deployed by coast lines to detect emissions from naval vessels in DPA(s).

Conventional radio system planning techniques, similar to those used to deploy cellular base stations, can be used to locate the receiver system(s) to ensure that the receiver system(s) detect operation of primary user(s). Pursuant to the regulation or standard, the ESC system designer must design an ESC system configured to detect emissions of a primary user in shared spectra in a certain amount, e.g., 99%, of a protection region (e.g., a DPA) with a certain amount, e.g., 95%, confidence of detection; the foregoing numbers are exemplary and may vary. However, these techniques do not account for the effect that the ESC system will have on potential locations of secondary users proximate to each receiver system of the ESC system. ESC system designs that better detect emissions of primary users in a DPA may result in increased detrimental effects on potential locations for secondary users near receiver system (s).

ESC systems must be protected from interference from secondary users. Aggregate interference from secondary users should not exceed an aggregate interference power spectral density threshold level, e.g., −109 dBm/MHz mean aggregate power spectral density for Citizens Broadband Radio Service (CBRS) pursuant to WInn Forum Working Document WINNF-TS-0112, version V1.4.1, Jan. 16, 2018 (incorporated herein by reference in its entirety). Particularly in densely populated areas near protection regions where primary users may operate, e.g., densely populated coastal regions, secondary users may be prohibited from transmitting at power spectral density levels at or above their minimum transmit power spectral density levels of their transmitters. Such regions—where secondary users are prohibited from transmitting at power spectral density levels at or above their minimum transmit power spectral density levels of their transmitters—are referred to as "dead zones". Practically, no secondary users can be deployed in such dead zones.

SUMMARY OF THE INVENTION

A method is provided. The method comprises: receiving parameter data of a receiver system and configuration data, where the configuration data comprises data, other than receiver system parameter data, configured to be used to model deployment of receiver system; determining prospective locations of radios controlled by a shared access system and in a region of impact; determining at least one radio transmit power level; determining a dead zone ratio; and based upon at least one of a protection region coverage ratio (PRCR) and the dead zone ratio, recommending whether or not to change at least one parameter of the receiver system.

DRAWINGS

DETAILED DESCRIPTION

Figure 1A:
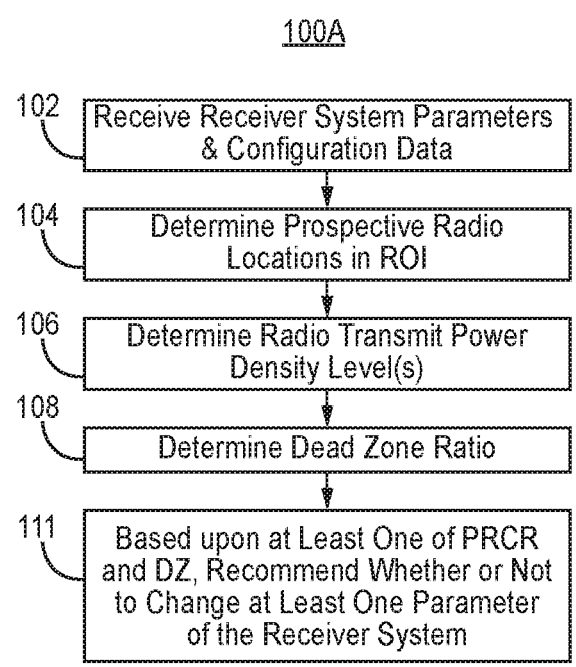
FIG. 1A illustrates a flow diagram of one embodiment of a method of modelling a dead zone and protection region coverage.

An operator of an ESC system desires not only to ensure that the ESC system can detect primary users in protection region(s) where primary users may be located, but also to diminish (and preferably minimize) the area of dead zone(s) created by receiver system(s) of the ESC system which would detrimentally affect where systems of secondary users can be deployed. Improved techniques for modelling deployment of a receiver system of an ESC system will be subsequently described. Such techniques model both dead zone(s) and protection region coverage of the receiver system of the ESC system. Recommendations may be provided how to diminish dead zone(s) resulting from a receiver system location and design and/or how to enhance protection region(s) coverage. As a result, satisfactory receiver system(s) designs may be achieved which provides required protection region(s) coverage and diminished corresponding dead zone(s). Dead zone means a region in which a transmitter of a radio is constrained from operating at or above a non-zero, minimum transmission power spectral density threshold; such a threshold provides a minimum acceptable electromagnetic energy coverage area in which (a) user equipment can receive transmissions from the radio, and optionally (b) the radio can receive transmissions from the user equipment. Note, power spectral density and power may be used interchangeably; power spectral density is a value with respect to unit power per unit frequency where power is a value with respect to just unit power. A receiver system may also be referred to herein as receiver circuitry.

First, exemplary shared spectrum technology will be discussed. An example of a spectrum access system controlling spectra shared by primary and secondary users is Citizens Broadband Radio Service regulated by the United States Federal Communications Commission (FCC) and industry standards. A comparable shared spectrum technology, Licensed Shared Access (LSA), has been proposed in Europe. However, the techniques proposed herein are applicable to any type of such spectrum access system. Further, wherever the term citizens broadband radio service device (CBSD) is used hereafter, it is an example of a radio frequency (RF) access system, or more generally a radio. In one embodiment, an RF access system is a base station, access point, or any other type of radio. The term "channel" may be used to describe a frequency channel or spectrum. The channel, for example, may be 5 or 10 MHz in bandwidth.

A CBRS will initially be described for pedagogical reasons. However, the invention applies to other shared spectrum systems, and will be subsequently described in more general terms, e.g., using the term radio rather than CBSD of a CBRS.

A CBRS comprises general authorized access (GAA) and/or priority access license (PAL) CBSDs and higher priority users, e.g., incumbent or primary users. The higher priority users, such as government users for example radar systems, e.g., on ships, have priority access to certain spectrum in the shared spectra. A shared access system (SAS) controller (which may otherwise be referred to as a shared access system or a SAS) grants the CBSDs access to the shared spectra, including assigning frequency spectrum (or channels) and optionally maximum transmission power. A SAS controller controls the transmission of GAA CBSDs so that they do not interfere with PAL CBSDs and the higher priority users. The GAA and PAL CBSDs are secondary users; the PAL CBSDs are secondary users because they have lower priority than higher priority users such as naval vessels. The SAS controller also controls the transmission of PAL CBSDs so that they do not interfere with the higher priority users. A SAS controller may also be referred to herein as SAS circuitry.

GAA CBSDs may be of two types: category A (low power) and category B (high power). Category A has a maximum transmission power spectral density of 30 dBm/10 MHz. Category B has a maximum transmission power spectral density of 47 dBm/10 MHz.

Incumbent users of shared spectra have first, or highest, priority to utilize the shared spectra controlled by the SAS controller. Thus, incumbent users shall be able to operate free of interference from other users, e.g., communications systems of priority access licensees and general authorized access users. Free of interference as used herein does not mean an absence of interference, but rather means less than an acceptable level, or threshold level, of interference—which may be no interference or less than a finite level of interference. The acceptable level of interference may vary by geography, frequency spectrum, user type, license type, and/or other indicia. In one embodiment, the incumbent users include government entities operating systems such as communications systems, operators of fixed satellite communications systems, and/or grandfathered, prior licensees of the frequency spectrum. Communications systems, as used herein, shall include radar systems (or radars).

In one embodiment, PAL users have second (or intermediate) priority, after incumbent users, to utilize the frequency spectrum controlled by the SAS controller. In another embodiment, a PAL user shall be able to operate, when incumbent users are free of interference of such a PAL user, and free of interference from other PAL users and general authorized access users. In one embodiment, an ability of a PAL user to operate free of interference shall be limited temporally, geographically, and spectrally within the specifications of its license.

GAA users have third, or lowest, priority to utilize the frequency spectrum controlled by the CBRS. In one embodiment, an operation of GAA users will be governed by laws, regulations, and/or rules (e.g., pertaining to CBRS). Such laws, regulations, and/or rules may be established by government(s) and/or standards bodies. For example, such rules shall only let GAA users' CBSDs operate when they do not interfere with communication systems of incumbent and PAL users.

In one embodiment, the geographic coverage area proximate to (e.g., covered by radio frequency emissions of) the CBSD may include exclusion zones and protection regions (including location(s) of fixed satellite service(s) (FSS(s)), priority access license (PAL) protection region(s) (PPA(s)), grandfathered wireless protection zone(s) (GWPZ(s)), DPA(s), and receiver system(s) of environmental sensing capability (ESC) system(s)). CBSDs are prohibited from operating in specific frequency spectrum in exclusion zones. Further, the level of interference generated by, e.g., by all non-government users and even some government users (including incumbent, PAL, and GAA users) shall be limited in a protection region so as not to interfere with certain incumbent user(s)' communications systems, for example radar on naval vessels, intended to be protected by the protection region. CBSDs may only operate, e.g., transmit, in shared spectra with the permission of the SAS controller. To ensure that interference in shared spectra at an incumbent user does not exceed an acceptable level and when the incumbent user's communication system is operating in a protection zone, the SAS controller may cause transmissions from one or more of the CBSDs to cease and/or transmission power of one or more CBSDs to be reduced. In some cases, this action by the SAS controller is be based upon information received by the SAS controller from an environmental sensing capability (ESC) system, external database(s), an incumbent user, and/or from a beacon. One type of protection region is the grandfathered wireless protection zone which is a geographic area and/or frequency spectrum where grandfathered wireless broadband licensees can operate free of interference, e.g., of CBSDs. The foregoing are examples of exclusion zones and protection regions; other types of exclusion and protection regions may occur.

Embodiments of the invention will now be described. Such embodiments address the above cited problem by determining whether dead zone area needs to be reduced and/or whether protection region coverage needs to be enhanced. If the dead zone area needs to be reduced, embodiments of the invention can determine parameters of a receiver system which can be modified to reduce dead zone area(s) and/or increase protection region coverage, such as receiver system (or at least antenna(s) of the receiver system) location. Because receiver system location is determined by location of the receiver system's antenna(s), antenna location will be subsequently be used in lieu of receiver system location. Further, embodiments of the invention may be used by a designer of an ESC system.

Receiver system parameters which can be modified include antenna radiation (or gain) pattern, antenna azimuthal angle (or antenna azimuth), front end gain of the receiver system, and/or antenna location (e.g., antenna longitudinal and latitudinal position and antenna height). However, receiver system parameters can include other parameters. For purpose of clarity, front end gain can be adjusted by varying the gain of amplifiers in the front end or by varying the attenuation of attenuators in the front end.

Minimum detectable power spectral density level of a receiver system is a function of receiver system parameters including front end gain. The gain of the front end of a receiver system can be adjusted by varying gain in the front end (e.g., the radio circuitry proceeding a first mixer or digital signal processor (DSP or DSP circuitry); this can be accomplished by varying gain of a low noise amplifier (LNA), varying gain of another amplifier following the LNA, and/or by varying attenuation in the front end, e.g., before or after the LNA. Reduction of front end gain can reduce both DPA coverage and dead zone area(s). In some embodiments, analysis is performed utilizing predictive and/or statistical modelling to determine the foregoing.

FIG. 1A illustrates a flow diagram of one embodiment of a method 100 of modelling a dead zone and protection region coverage. The blocks of the flow diagrams herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). The methods illustrated herein can be implemented by the systems illustrated herein but need not be.

The illustrated technique is used for geographic regions near the receiver system that have high population densities, and thus radio deployments near the receiver system. For such a scenario, reduction of dead zone area is prioritized over increasing protection region coverage. The technique provides recommendations to reduce dead zone area and/or increase protection region coverage.

Figure 1B:
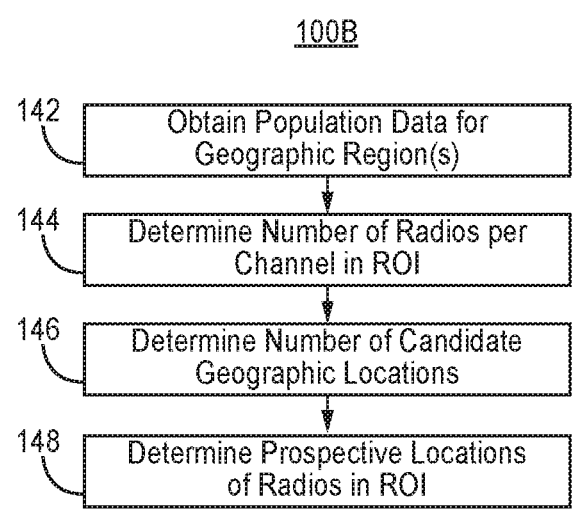
FIG. 1B illustrates a flow diagram of one embodiment of a method of determining prospective locations of radios in the region of impact.

Optionally, whether the method of FIG. 1A or an alternative method of FIG. 1D (subsequently described) is used by the ESC system designer may be determined manually by the ESC system designer, or automatically, e.g., based upon whether an average population density in a region of impact (ROI) is greater than or equal to a population threshold density level. The ROI is an area centered around a prospective location of a receiver system or antenna(s) of the receiver system. The ESC system designer may select the population threshold density level. If such average population density in the ROI is greater than or equal to the population threshold density level, then the method of FIG. 1A is used. However, if such average population density in the ROI is less than the population threshold density, then the method of FIG. 1D is used. This determination can be performed in a block before or after block 102 shared by both methods of FIGS. 1A and 1D. (However, each of the methods of FIGS. 1A and 1D may be performed without the foregoing selection.) Thus, for example, based upon the aforementioned average population density level determination, analysis can proceed to block 104 of FIG. 1A or block 112 of FIG. 1D.

An ESC system designer can use, e.g., iteratively, the techniques illustrated in FIG. 1A to obtain reduced dead zone area and/or satisfactory protection region coverage. A user of the methods illustrated herein is described as an ESC system designer for pedagogical purposes; however, the user may be another person or entity (e.g., a computer system or other machine) and thus may be more generally described as a 'user'. For pedagogical reasons, however, the term ESC system designer will be used in lieu of user, although user can be substituted in its place. In some embodiments, e.g., with respect to the subsequently described automated method of FIG. 1E, the ESC system designer selects the increments by which to modify receiver system parameter(s) to be changed by the methods; alternatively, such increments may be defined externally (e.g., by the designer of the analysis system or another) or by the analysis system.

In block 102, receive receiver system parameter data and configuration data. Receiver system parameters include antenna location and at least one other receiver system parameter. Receiver system parameter data means parameter data of the receiver system which can be used to simulate reception performance of the receiver system. The received receiver system parameters, including antenna location, are proposed receiver system parameter, e.g., proposed by a designer of an ESC system. Configuration data means data, other than receiver system parameter data, used to model deployment (in geographic location(s)) of receiver system(s) of an ESC system. The configuration data includes at least one of: candidate geographic location(s)[1], candidate receiver system location(s), a dead zone threshold level, a first protection region threshold level, a second protection region threshold level, population densities for different types of morphologies and/or geographical regions, a market penetration factor, a channel factor, region(s) of impact (ROI(s)), an aggregate interference power spectral density level at a receiver system from radios, a confidence level, a radiated peak power spectral density level, a dead zone threshold level, a first protection region coverage ratio level, a second protection region coverage ratio level, a threshold flatness level, a population density threshold level, minimum inter-radio distance(s), number of users per radio (e.g., based upon population density, morphology, and/or radio category), population data for geographic region(s), receiver system parameter increment(s), a first threshold transmit power spectral density level, and a second threshold transmit power spectral density level. Candidate receiver system locations are locations, e.g., buildings or towers, where receiver systems (or antennas of receiver systems) may be located. In one embodiment, when the protection region is a dynamic protection region, the candidate receiver locations are located near a shoreline.

[1] Candidate geographic locations of radios (or candidate geographic locations or CRLs) means geographic areas where radios may be located.

The region of impact means an area around the receiver system in which dead zone analysis is performed, and may be designated in the configuration data by one or more parameters, e.g., a radius of a circle centered on the antenna location. If the ROI is defined, for example by a WinForms standard WINNF-TS-0112-V1.4.1 CBRS Operational and Functional Requirements, by a radius, the radius may be 40 km (if only Category A radios are proximate to the receiver system) or 80 km (if at least one Category B radio is proximate to the receiver system). Category A radios are used in the simulation in geographic regions having population densities (e.g., based upon census data or morphology data) less than a population density threshold level and/or in certain morphologies, e.g., in rural morphologies. Category B radios are used in the simulation in geographic regions having population densities (e.g., based upon census data or morphology data) equal to or greater than the population density threshold level and/or in certain morphologies, e.g., in rural morphologies. The aggregate interference power spectral density threshold level at a receiver system may be a mean aggregate interference power spectral density threshold level.

In block 104, determine prospective locations of radios (or prospective radio locations) controlled by a SAS and in a region of impact. Prospective locations for radios (or prospective radio locations) means locations of simulated radio deployments for the purposes of the analysis herein. In some embodiments, this may be performed as described below; however, this block may be performed in other ways. FIG. 1B illustrates a flow diagram one embodiment of a method 100B of determining prospective locations of radios in the region of impact 104.

In block 142 of FIG. 1B, obtain population data for geographic region(s) encompassed by the ROI. Optionally, obtain such population data for the geographic region from an external database, e.g., from a national governmental entity (for example the U.S. Census Bureau), a commercial, and/or another non-commercial source. Optionally, obtain additionally data for the geographic region, such a map data and/or geographic morphology data, e.g., from similar source including the U.S. Geological Survey.

Optionally, the geographic region encompassed by the ROI may comprise one or more larger geographic regions, e.g., counties, towns, and/or cities, and/or one or more smaller geographic regions, e.g., blocks and/or tracts. The population data for the geographic region may be comprised of population data broken down by the one or more larger geographic regions and/or the one or more smaller geographic regions. Optionally, a larger geographic region may comprise one or more smaller geographic regions. The population data for a larger geographic region may be comprised of population data broken down by the one or more smaller geographic regions. Thus, optionally, obtain population for data for the geographic region comprising obtaining data for at least one of: at least one larger geographic region, and at least one smaller geographic region; in some embodiments, population data for smaller geographic region(s) forming a larger geographic region may be obtained in lieu of obtaining population data for the larger geographic region.

In block 144, determine a number of radios per channel in the region of impact. The number of radios per channel is equal to the number of prospective locations for radios. In one embodiment, the number of radios per channel, $N_{ROI}$, (where the ROI is determined using single geographic region) is:

$$N_{ROI} = ceil\left(\frac{\text{Population of Geographic Region} * \text{Market Penetration Factor} * \text{Channel Factor}}{\text{Number of Users/Radio}} * R\right), \quad \text{(Equation 1)}$$

where $R = \dfrac{\text{Number of Candidate Geographic Locations within the Geographic Region within the ROI}}{\text{Total number of Candidate Radio Locations within the Geographic Region}}$.

R is a unitless scaling factor or ratio for the single geographic region related to candidate radio locations. Alternatively, R can be a ratio of area of a geographic region within the ROI with respect to the area of the geographic region. Candidate geographic locations may be provided by the ESC system designer, the analysis system, and/or an external database. The candidate geographic locations are constrained so that the distance between radios exceed the minimum inter-radio distance for the radio having the highest transmit power spectral density level of adjacent pairs of radios. The minimum inter-radio distance, and thus any deployment scaling factor (described elsewhere herein), may vary based upon geographic morphology, and/or radio category type (e.g., maximum radio transmit power spectral density level). The minimum inter-radio distance—which can range from meters to kilometers—and/or any deployment scaling factor may be defined by the ESC system designer and/or automatically determined by a system performing the analysis described herein.

The number of users per radio may be determined by an ESC system designer (or some other source such as a standard or specification) and will vary based upon geographic morphology (urban, suburban, rural, etc.); the number of users per radio is an estimated number of user equipment per radio. Typically, higher power radios, e.g., Category B, will serve more users (or user equipment) than lower power radios, e.g., Category A.

Market penetration factor is another scaling factor representing a percentage of users (e.g., end user devices utilizing radios such as GAA CBSDs) of the corresponding shared spectra as a percentage of the population of the corresponding geographic region being analyzed. The market penetration factor can be obtained from the ESC system designer or another source. The market penetration factor can be varied by the ESC system designer, and ranges between zero and a positive number, for example one. The channel factor is another scaling factor representing the number of radios expected to share a channel in a geographic region. The channel factor, for example, ranges from zero to one. Further, for example, if there are X radios using non-overlapping channels in shared spectra having a bandwidth $BW_{SS}$ and each channel has a bandwidth $BW_{CH}$, then the number of radios sharing a given channel is $(BW_{CH}/BW_{SS})*X$, where the channel factor is $(BW_{CH}/BW_{SS})$. The channel factor may be provided by the ESC system designer or obtained from another source. In other embodiments, other equations for determining the number of radios can be used; for example, a subset of the aforementioned scaling factors may be used. Alternatively, other scaling factors may be used in addition to and/or in lieu of the above described scaling factors.

Determining the number of radios in the ROI as a whole may not accurately predict locations of radios in the geographic region. Some portions of the geographic region may have higher population densities than others, and thus would require a higher density of radios. Thus, in another embodiment, the number of radios in each constituent larger and/or smaller geographic region forming the geographic region may be determined.

In some embodiments, the geographic region encompassed by the ROI may comprise at least one larger geographic region and at least one smaller geographic region (which is not a constituent of any of the at least one larger geographic region), or by at least two larger or small geographic regions. Optionally, if a larger geographic region comprises smaller geographic regions, the number of radios in a larger geographic region is determined by summing the number of radios in the smaller geographic regions forming the larger geographic region. Alternatively, the number of radios in the larger geographic region may be analyzed on a smaller by smaller geographic region basis.

When determining a number of radios per channel in an ROI (comprising two or more geographic regions) on a geographic by geographic region basis, the number of radios per channel in the region of impact, $N_{ROI}$, is:

$$N_{ROI} = \text{ceil}(\Sigma_i R_i * N_i), \quad \text{(Equation 2)}$$

where $$R_i = \frac{\text{Number of Candidate Radio Locations within the } i\text{th Geographic Region with the ROI}}{\text{Total Number of Candidate Radio Locations within } i\text{th Geographic Region}},$$

and each location may be a small or large geographic region. $N_i$ is the number of radios per channel in an $i^{th}$ geographic region. $R_i$ is a unitless scaling factor or ratio for the ith geographic region and related to candidate radio locations. Alternatively, $R_i$ can be a ratio of area of a geographic region within the ROI with respect to the area of the geographic region.

Figure 1C:
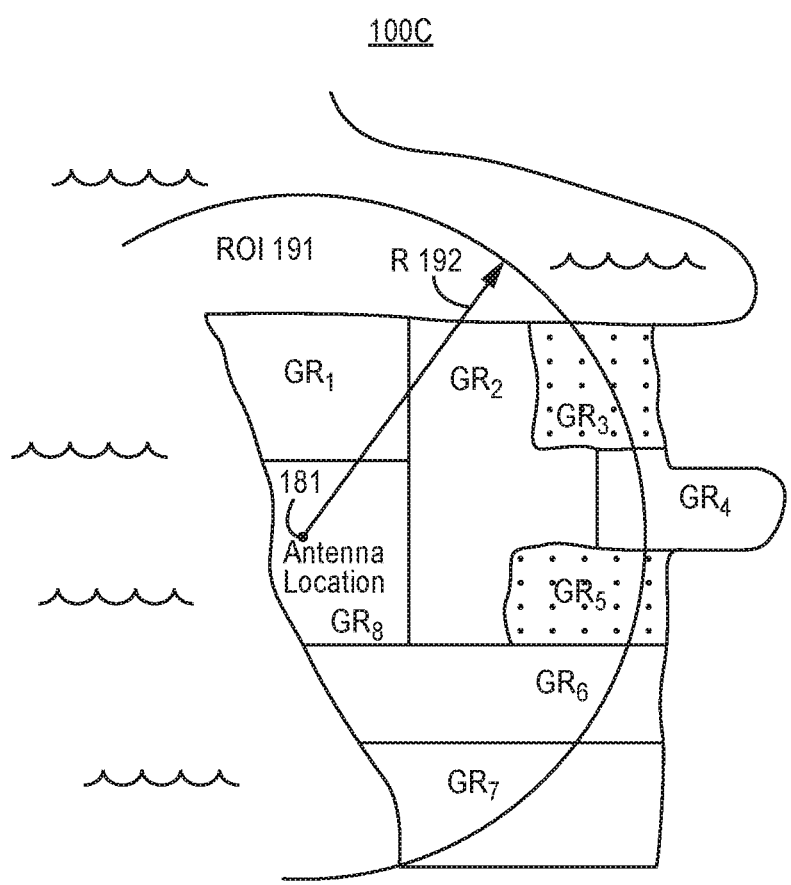
FIG. 1C illustrates a diagram of one embodiment of geographic regions in a region of impact.
Figure 1D:
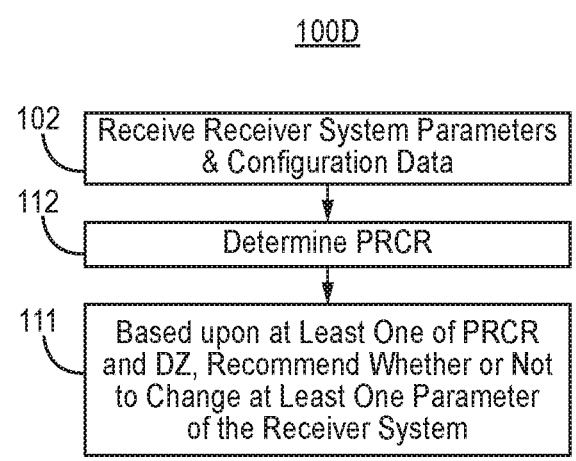
FIG. 1D illustrates a flow diagram of another embodiment of a method of modelling a dead zone and protection region coverage.

FIG. 1C illustrates a diagram of one embodiment of geographic regions in a region of impact. Geographic regions (GRs) 1-8 are illustrated in FIG. 1C. All of $GR_1$, $GR_2$, and $GR_8$ are within the ROI 191 having a radius, R, 192. However, only a portion of each of $GR_3$, $GR_4$, $GR_5$, $GR_6$, and $GR_7$ are within the ROI 191. Potential radio locations (total and within the ROI 191) are illustrated by points for $GR_3$ and $GR_5$.

In block 146, determine a number of candidate geographic locations for each geographic region, $CL_{GR_i}$, where $$CL_{GR_i} = \text{ceil}(\text{Deployment Scaling Factor} * R_i * N_i). \quad \text{(Equation 3)}$$

The ceil function means a function that rounds a number up to the next largest integer. The deployment scaling factor is a scaling factor whose unit is candidate geographic locations per radio, and is a positive number constrained by the minimum inter-radio distance (which varies by geographic morphology and the transmit power spectral density levels of radios that could be deployed in any geographic region(s), e.g., smaller geographic region(s)). The minimum inter-radio distance ensures a balance of radio network capacity and inter-radio interference. The deployment scaling factor ensures that the minimum inter-radio distance is satisfied to ensure a more realistic distribution of radios in the analysis.

If a single geographic region is analyzed with respect to the ROI, then a maximum value of i=1. If more than one geographic region (e.g., smaller and/or larger geographic regions) are analyzed with respect to the ROI, then the maximum value of i is greater than 1, and the total number of candidate geographic locations (for deployment of radio (s)) for each geographic region must be determined using Equation 4. The total number of candidate geographic locations in the ROI, $CL_{ROI}$, comprising more than two geographic regions is determined as follows:

$$CL_{ROI} = \Sigma_i CL_{GR_i} \quad \text{(Equation 4)}$$

Optionally, if an ROI encompasses at least one larger geographic region comprised of smaller geographic regions, then determine the number of candidate geographic locations, $CL_{SGR}$, in each smaller geographic region comprising each of the larger geographic regions.

In some embodiments, the number of candidate geographic locations for each larger geographic region formed by smaller geographic region is the sum of the candidate geographic locations for the corresponding smaller geographic regions forming the larger geographic region. In some embodiments, the number of candidate geographic locations in the geographic regions is the sum of candidate geographic locations for all larger geographic regions in the geographic region, and the sum of all candidate geographic locations in the smaller geographic region(s) but not in a larger geographic region(s) in the geographic region.

Optionally, if a first ROI of a first receiver system of an ESC system overlaps a second ROI of a second receiver system of the ESC system, then the scaling factor related to candidate radio locations for each geographic region (R or $R_i$) where the overlap of ROIs occurs is:

$$\frac{|\{CRLs \text{ within an } i\text{th Geographic Region within First } ROI\} \cup \{CRLs \text{ within the } i\text{th Geographic Region within the Second } ROI\}|}{\text{Total Number of Candidate Radio Locations within the } i\text{th Geographic Region}} \quad \text{(Equation 5)}$$

where $|\{A\}|$ is the cardinal value of a set $\{A\}$, and $\cup$ is a set union operation. Thus, the scaling factor for a geographic region is a ratio determined by dividing (a) an cardinal value of a union of a set of candidate radio locations within the geographic region within the first ROI and a set of candidate radio locations within the geographic region of the second ROI by (b) the total number of candidate radio locations within the geographic region.

A number of different ways of determining candidate geographic regions have been illustrated above. However, the illustrated ways are neither exhaustive nor limiting. In block 148, determine prospective radio locations in the determined candidate radio locations in the ROI. For example, the prospective radio locations can be determined using a uniform distribution of determined candidate radio locations and one instance of a Monte Carlo simulation for each radio (per channel) of the number of radios per channel determined to be in the region of impact, $N_{ROI}$. A radio will be modelled for each determined prospective radio location. The category, and hence the maximum transmit power spectral density level, is determined as described elsewhere herein.

Returning to FIG. 1A, in block 106, determine a transmit power spectral density level for each radio in a determined prospective radio location. Optionally, the radio transmit power spectral density level is determined using an iterative allocation process (IAP) and the radio parameters to ensure that cumulative interference from radios at a protection point remains below a first threshold transmit power spectral density level, e.g., determined by law or regulation. However, other techniques may be used. WInnForum Shared Access System general requirement (requirement) R2-SGN- 16 of WINNF-TS-0112 defines an embodiment of IAP, and is hereby incorporated by reference herein in its entirety. The IAP determines such maximum transmit power spectral density levels by allocating interference margin fairly to radios in neighborhood(s) of protection point(s) proximate to the radios. The IAP determines such transmit power spectral density levels by allocating interference margin fairly to radios in neighborhoods of protection point(s), e.g., of one or more of each of a location of a DPA, a fixed satellite service, a location of a priority access license protection area, a grandfathered wireless protection zone, and location(s) of receiver system(s) of environmental sensing capability system(s).

Optionally, the radio transmit power spectral density level is determined using a two step process, e.g., using IAP. The first step is performed as described above. Then, identify any radio(s) having determined transmit power spectral density levels below a second threshold transmit power spectral density level, e.g., which may be equal to or less than the minimum transmit power spectral density threshold level of a radio's category or type, e.g., 23 dBm/MHz for a Category A (relatively low power) GAA CBSD and 40 dBm/MHZ for a Category B (relatively high power) GAA CBSD. Minimum transmit power spectral density level means a transmit power spectral density level that provides a coverage area (i.e., electromagnetic energy coverage area) by a corresponding radio so that a commercially viable number of radio(s) may be used to provide coverage to a geographic area in which the radio(s) are located. User equipment in the coverage area can receive signals transmitted from the corresponding radio. A minimum transmit power spectral density level of a radio results in a minimum coverage area (e.g., of about 200 meters for a Category A GAA CBSD having an antenna height of 3 to 6 meters and of about 500 meters for a Category B GAA CBSD having an antenna height of about 30 meters).

Any identified radio(s) are eliminated from the second step (second IAP step; because they have insufficient transmit power densities). Radio transmit power spectral density level is again determined, e.g., using IAP, for the radios not eliminated (remaining radios). The two step process increases the interference head room for the remaining radios so that the power spectral density levels of the remaining radios can be increased. Thus, for example, radio(s) determined to have a radio transmit power spectral density level below the minimum transmit power spectral density level for its radio category or type but above the second threshold transmit power spectral density can have, during the second step, their transmit power spectral density increased to be above the minimum transmit power spectral density threshold level for its radio category. As a result, the dead zone area can be reduced as a result of the two step process.

In block 108, determine an ESC system dead zone ratio. ESC system dead zone ratio may also be referred to herein as an ESC dead zone ratio, a dead zone ratio, or a DZ. ESC dead zone ratio means a ratio of a number of radios allocated transmit power spectral density level(s) below a minimum transmit power spectral density level corresponding to each radio with respect to a number of radios in the ROI, $N_{ROI}$, or a ratio of a total coverage area of radios allocated transmit power spectral density level(s) below a minimum transmit power spectral density level corresponding to each radio with respect to the area of the ROI. This entails determining either the number of radio(s) in the ROI allocated transmit power density levels below the minimum transmit power spectral density level corresponding to each radio, or determining the total coverage area of radios allocated transmit power spectral density level(s) below a minimum transmit power spectral density level corresponding to each radio.

Optionally, because radio deployment density is proportional to average population density in the ROI, alternatively the dead zone ratio may be determined as a linear or non-linear function of average population density in the ROI. For example, the dead zone ratio may be linearly or non-linearly proportional to an average population density in the ROI. The dead zone ratio increases with an increasing average population density in the ROI. Note, even if receiver system parameters are not optimal, the ESC dead zone ratio may be satisfactorily low due to a relatively low percentage of radios determined to have transmit power spectral density levels below a minimum operating level due to the receiver system.

In block 111, based upon at least one of a protection region coverage ratio (PRCR) and the ESC dead zone ratio, recommend whether or not to change at least one parameter of the receiver system. In block 111, at least one of the PRCR and the ESC dead zone ratio are compared with at least one corresponding user defined threshold level to determine if (a) the PRCR in excess of at least one corresponding user defined PRCR threshold level and/or (b) the ESC dead zone ratio is less than a corresponding user defined threshold level. User defined threshold levels disclosed herein may be determined by those implementing and/or using the systems and methods described herein.

Figure 1E:
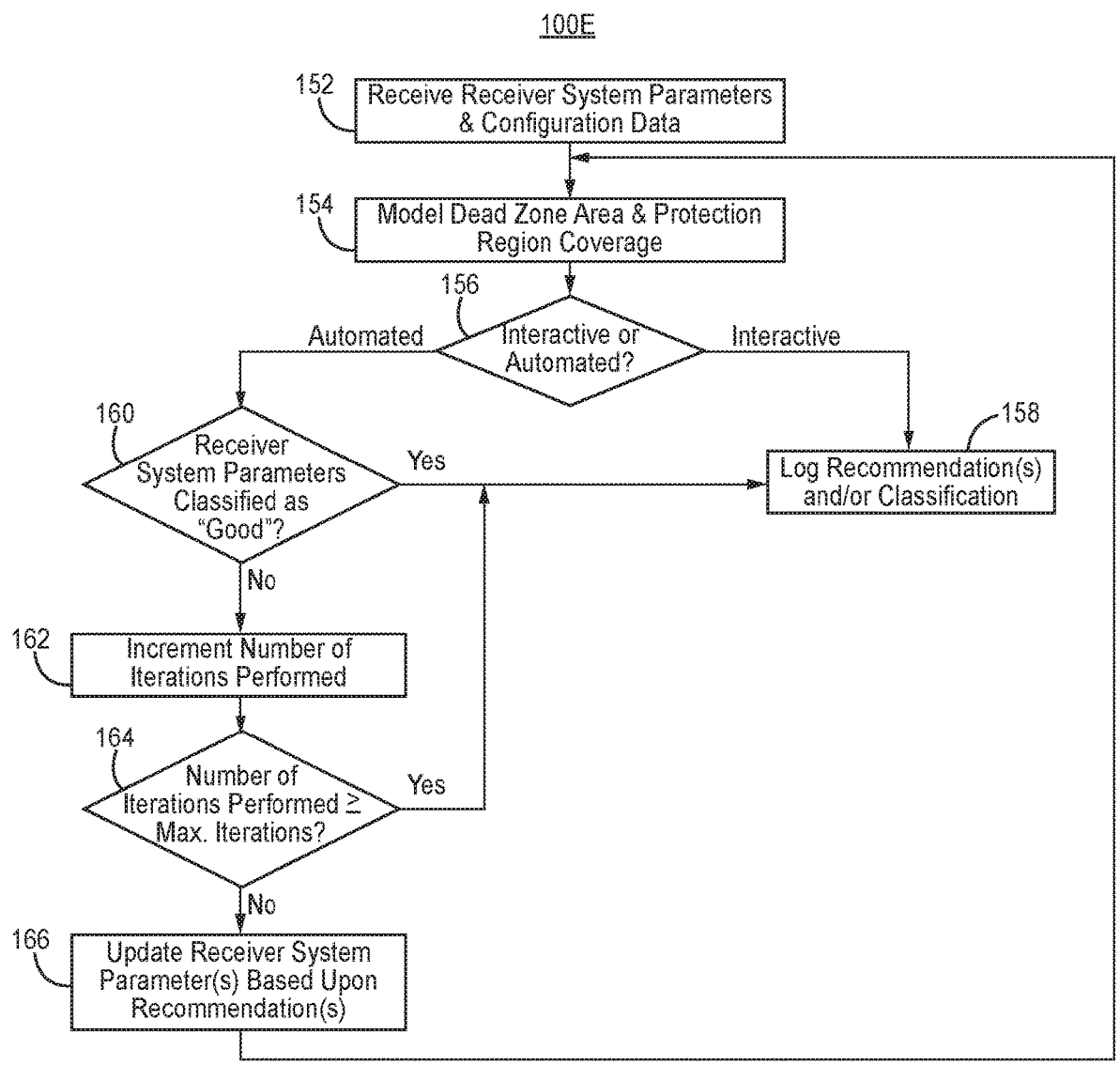
FIG. 1E illustrates a flow diagram of one embodiment of a method for automatically determining recommendations and classifications for receiver system parameters.
Figure 1F:
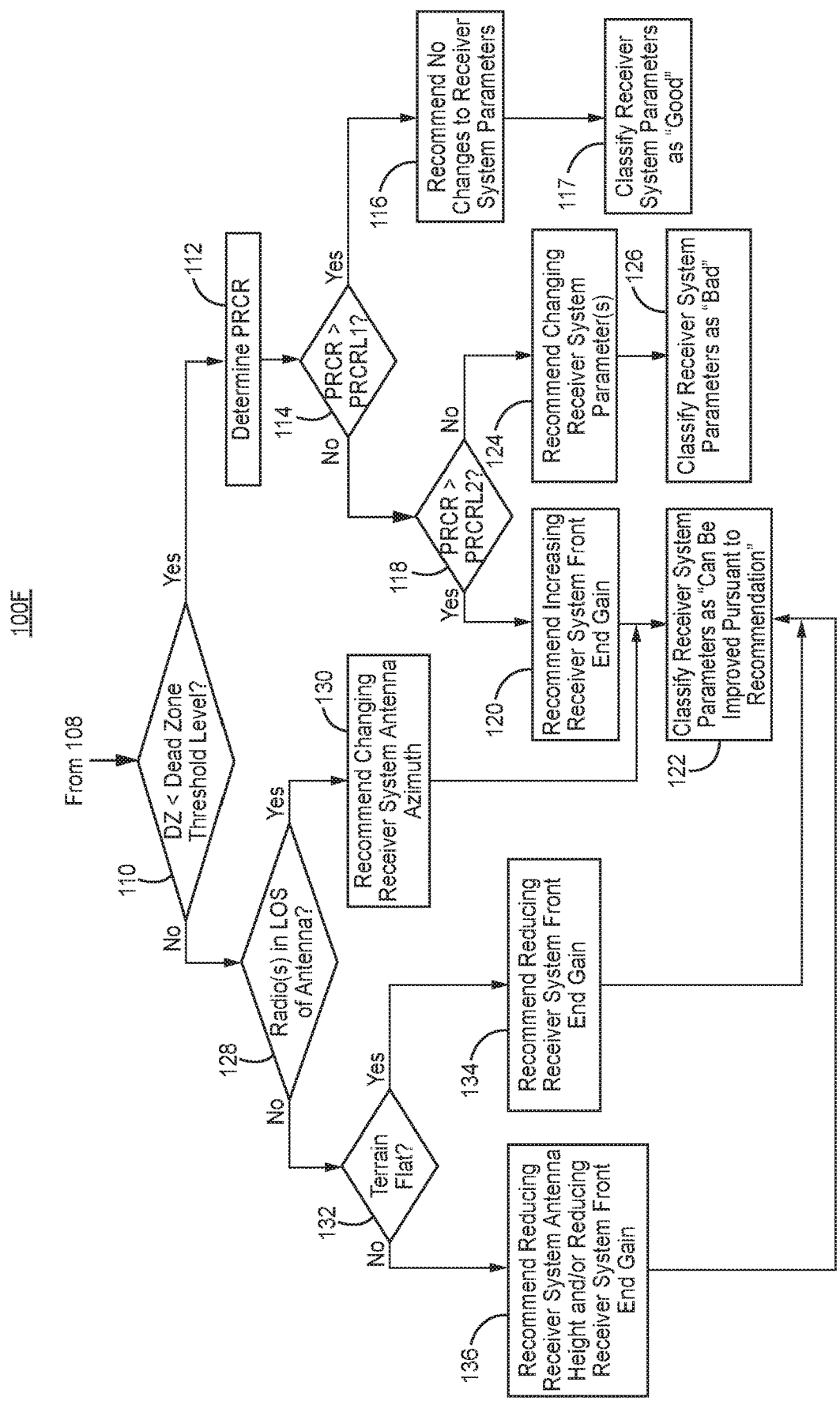
FIG. 1F illustrates a flow diagram of one embodiment of a method, based upon at least one of the protection region coverage ratio and the environmental sensing capability dead zone ratio, of recommending whether or not to change at least one parameter of the receiver system.

FIG. 1F illustrates a flow diagram of one embodiment of a method 100F, based upon at least one of the PRCR and the ESC dead zone ratio, of recommending whether or not to change at least one parameter of the receiver system, e.g., how to implement block 111 of FIG. 1A. In block 110, determine if the ESC dead zone ratio is below a dead zone threshold level, e.g., a number within the range 0.01 to 0.1. The dead zone threshold level may be determined by the ESC system designer.

If the ESC dead zone ratio is below the dead zone threshold level (corresponding to a de minimis or no dead zone), then in block 112 determine a protection region coverage ratio (PRCR). PRCR means a ratio of (a) a portion of the protection region in which the receiver system can detect a signal of a primary user having a certain radiated peak power spectral density level (e.g., −89 dBm/MHz) with respect to (b) the total area of the protection region. The certain radiated peak power spectral density level may be designated by standard, rule, and/or law. When determining PRCR, the main beam of the antenna of the primary user is assumed to be pointing at the location of the antenna of the receiver system. Optionally, detection must be made with a certain level of confidence, e.g., path loss reliability level of, e.g., 0.95. The level of confidence may vary based upon distance. For example, the level of confidence may be a first level of confidence, e.g., 0.95, for points or regions within a first distance, e.g., ten kilometers, of the antenna location, but a second, lesser level of confidence, e.g., 0.5, for distances greater than the first distance. For example, such distances are radial distances from a location of the antenna (s) of the receiver system. The radiated peak power spectral density level and the dead zone threshold level may be defined by law, regulation, or standard. The confidence level may be defined by the law, regulation, standard, or the ESC system designer.

Whether receiver system can detect a signal of a primary user at different points or areas in the protection region can be determined as follows. A propagation model, such as the irregular terrain model (ITM) can be used to determine path loss(es), e.g., with a corresponding confidence level, from each point or area throughout, e.g., constituting, the protection region to the antenna location of a receiver system. Using the determined path loss(es) and the radiated peak power spectral density level of the primary user, the power spectral density level at the antenna location can be determined. Using other receiver system parameters, such as antenna radiation (or gain) pattern, antenna azimuthal angle (or antenna azimuth), and/or front end gain of the receiver system, the power spectral density level to be detected by the receiver system from each point or area can be determined. If the determined detected power spectral density level from a point or area is equal to or exceeds the minimum detectable power spectral density level, a point or area is deemed to be detectable. If the determined detected power spectral density level is less than the minimum detectable power density level, then the point or area is deemed not to be detectable. The protection region coverage ratio means a number of points or regions in a protection region in which the determined detected power spectral density level is equal to or exceeds the minimum detectable power spectral density level with respect to the total number of points or regions in the protection region. The minimum detectable power spectral density level means the minimum detectable power spectral density level of a corresponding receiver system. Protection region means a region with one or more protection points or regions, e.g., a dynamic protection area or a priority access license protection area.

In block 114, determine if the protection region coverage ratio is greater than a first protection region coverage ratio level (PRCRL1), e.g., 0.99. In block 114, a determination is made whether coverage of the protection region meets requirements, e.g., established by law, regulation, and/or standard. Protection region coverage ratio levels may be determined by the ESC system designer, law, regulation, or standard. If the protection region coverage ratio is determined to be greater than the first protection region coverage ratio level, then then in block 116, recommend no changes to receiver system parameters. Then, optionally, in block 117, classify the receiver system parameters as "Good Receiver System Parameters" or "Satisfactory Receiver System Parameters".

Such a good classification means that a receiver system with such parameters will satisfy criteria for reduced dead zone area and protection region coverage. Further, optionally provide that classification to the system user, e.g., the ESC system designer. Typically, the ESC designer will not re-run the analysis upon learning that the receiver system parameters are good. Optionally, if the receiver system parameters are classified as good, then optionally, deploy and/or operate the receiver system according to such parameters.

If the protection region coverage area is determined to be less than or equal to the first protection region coverage ratio level, then in block 118, determine if the protection region coverage ratio is greater than a second protection region coverage ratio level (PRCRL2), e.g., 0.85, which is less than the first protection region coverage ratio level. Block 118 determines whether the coverage of the protection region is close enough to PRCRL1 so that receiver parameter system parameters can be adjusted to improve the coverage to exceed PRCRL1.

If the protection region coverage area is determined to be greater than the second protection region coverage ratio level, then in block 120 recommend to the system user, e.g., ESC system designer, increasing the front end gain of the receiver system. Further, optionally, then in block 122, classify the receiver system parameters as "Receiver System Parameters Can Be Improved Pursuant to Recommendation". Further, optionally, provide that classification to the system user, e.g., ESC system designer. Typically, upon receiving notification that receiver system parameters can be improved pursuant to the recommendation, the ESC system designer will re-run the analysis after implementing the suggested modification in the receiver system parameters used for analysis.

If the protection region coverage area is determined to be less than or equal to the second protection region coverage ratio level, then in block 124 recommend to the system user, e.g., ESC system designer, changing receiver system parameters, e.g., antenna location, antenna height, and/or front end gain. For example, antenna location can be changed to neighboring receiver system candidate locations.

Further, optionally, then in block 126, classify the receiver system parameters as "Bad" or "Unsatisfactory". "Bad" means that the receiver system parameters are unsatisfactory because the receiver system implemented with the receiver system parameters has a dead zone ratio greater than a user defined dead zone ratio threshold level and/or the protection region coverage ratio is less than a user defined PRCR threshold level.

Further, optionally, provide that classification to the system user, e.g., ESC system designer. Typically, the ESC system designer will then modify parameter(s) of the receiver system, e.g., antenna location, and re-run the analysis.

Returning to block 110, if the ESC dead zone ratio is determined not to be less than the dead zone threshold (and thus a dead zone is determined to exist), then proceed to block 128. In block 128, determine if at least one radio in the ROI is in the line of sight (LOS) of a main beam of the antenna of the receiver system. Line of sight can be determined by assessing if any terrain intersects a line (between a three dimensional location of a radio (or antenna of a radio) in the ROI and a three dimensional location of the antenna of the receiver system) that exceeds the altitude of a line at the intersection. The radio or antenna of the radio may have an altitude of corresponding terrain of their respective location (terrain), or another altitude plus the terrain level. The other altitude for example can represent the height of an antenna on a tower (e.g., mounted at the top of or midway on the tower).

Line of sight can become an issue, for example, near coastline(s). Due to the complex nature of coast lines, radio(s) near coastline(s) may be in line of sight of the main beam of the antenna of the receiver system.

If at least one radio in the ROI is determined to be in the line of sight of the main beam of the antenna of the receiver system, then in block 130, recommend changing receiver system antenna azimuth (or azimuthal angle) away from the radios (in the ROI) in the line of sight of the main beam of the antenna, and/or towards the protection region. Optionally, then proceed to block 122. Further, optionally, provide the classification of block 122 to the system user, e.g., ESC system designer.

If no radios in the ROI are determined to be in the line of sight of the main beam of the antenna of the receiver system, then in block 132 determine if terrain in area(s) about or around the antenna of the receiver system are 'flat'. Side or back lobes of the antenna of the receiver system may overlap or cover radio(s) in the ROI. If the terrain is flat, the interference is higher than if the terrain is irregular (not flat).

The area(s) may comprise all or a portion of the ROI. Optionally, the area may be the area(s) in which the radios that are determined to have radio power spectral density levels below the first threshold transmit power spectral density level and/or the second threshold transmit power spectral density level. Optionally, flatness may be determined based upon whether the standard deviation of elevation distribution of all paths between radios in the dead zone and the antenna of the receiver system is equal to or below a threshold flatness level (e.g., where the threshold flatness level is user system defined); flatness may however be determined in other ways. Flatness means an indication of variation of terrain elevation in an area. As an example, for a given area or region, if the standard deviation of the elevation distribution of all paths between radios in the dead zone and the antenna of the receiver system is less than or equal to 10 feet, then that area is characterized as having a flat terrain.

If the terrain in area(s) about the antenna is determined to be flat, then in block 134 recommend reducing receiver system front end gain, e.g., to compensate for antenna gain that is too high. Dead zone area can be reduced, e.g., by decreasing receiver system front end gain and/or antenna gain. Optionally, if feasible, recommend reducing antenna gain.

Optionally, then proceed to block 122. Further, optionally, provide the classification of block 122 to the system user, e.g., ESC system designer.

If the terrain in area(s) about the antenna is determined to not be flat, e.g., is irregular, then in block 136 recommend reducing height of the antenna of the receiver system and/or front end gain of the receiver system. Optionally, firstly antenna height is reduced or decremented within a range of maximum height (e.g., tower height) and a minimum height (e.g., height at base of tower); then, secondly, front end gain is reduced or decremented.

Irregular terrain causes higher path loss. The receiver system can increase the path loss in irregular terrain by reducing antenna height and/or antenna gain, and/or reducing receiver front end gain. Dead zone area can be reduced, e.g., by reducing antenna height and/or receiver front end gain. Optionally, then proceed to block 122. Further, optionally, provide the classification of block 122 to the system user, e.g., ESC system designer.

FIG. 1D illustrates a flow diagram of another embodiment of a method 100 of modelling a dead zone and protection region coverage. The illustrated technique is used for geographic regions near the receiver system that have low population densities, and thus may not have radio deployments near the receiver system. For such a scenario increasing protection region coverage is prioritized over reduction of dead zone area.

Optionally, whether the method of FIG. 1A or an alternative method of FIG. 1D (subsequently described) is used by the ESC system designer may be determined manually by the ESC system designer, or automatically, e.g., based upon whether an average population density in the ROI is greater than or equal to a population threshold density level. The ESC system designer may select the population threshold density. If such average population density in the ROI (centered around a prospective location of a receiver system) is greater than or equal to the population threshold density level, then the method of FIG. 1A is used. However, if such average population density in the ROI is less than the population threshold density level, then the method of FIG. 1D is used. This determination can be performed in a block before or after block 102 shared by both methods of FIGS. 1A and 1D. (However, each of the methods of FIGS. 1A and 1D may be performed without the foregoing selection.)

Thus, for example, based upon the determination made in the block, analysis can proceed to block 104 of FIG. 1A or block 112 of FIG. 1D.

The technique provides recommendations to reduce dead zone area and/or increase protection region coverage. An ESC system designer can use, e.g., iteratively, the techniques illustrated in FIG. 1D to obtain satisfactory protection region coverage and reduced dead zone. However, the ESC system designer selects the increments by which to modify receiver system parameter(s) recommended to be changed by the method.

The blocks of FIG. 1D are the same as FIG. 1A, but are reordered so that protection region coverage is analyzed prior to dead zone analysis. Block 112 follows block 102. Block 111 follows block 112.

Figure 1G:
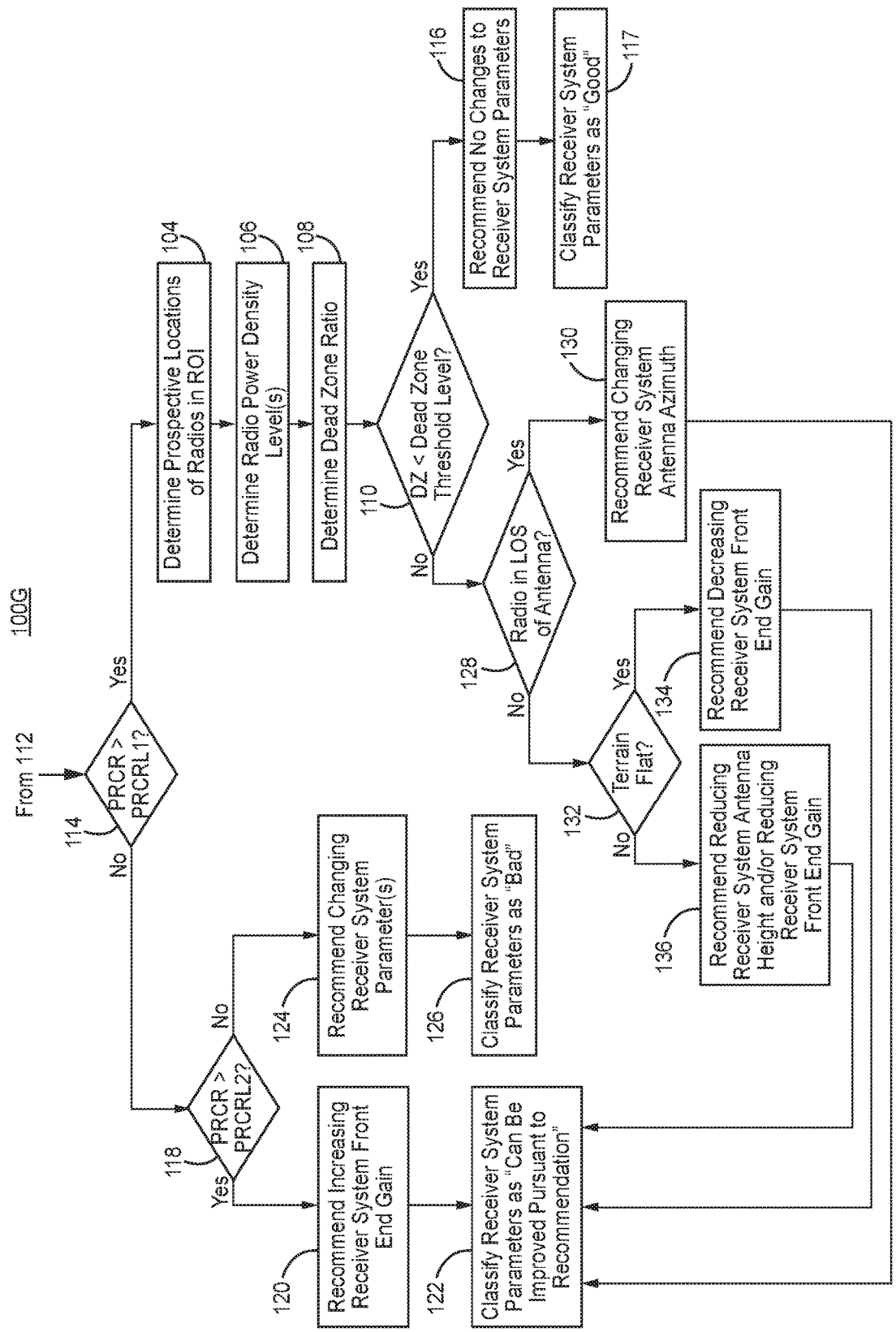
FIG. 1G illustrates a flow diagram of another embodiment of a method, based upon at least one of the protection region coverage ratio and the environmental sensing capability dead zone ratio, of recommending whether or not to change at least one parameter of the receiver system.

FIG. 1G illustrates a flow diagram of another embodiment of a method 100G, based upon at least one of the protection region coverage ratio and the environmental sensing capability dead zone ratio, of recommending whether or not to change at least one parameter of the receiver system e.g., how to implement block 111 of FIG. 1D. Block 114 follows block 111. Again, in block 114, a determination is made whether coverage of the protection region meets requirements, e.g., established by law, regulation, and/or standard. If in block 114, the protection region coverage ratio determined to be greater than the first protection region coverage ratio level (PRCRL1), then proceed to block 104; if the PRCR is determined to be greater than PRCRL1, then recommend changing at least one parameter of the receiver system. From block 104, proceed through blocks 106, 108, and 110 as discussed above. If in block 110, the ESC dead zone ratio is below the dead zone threshold level (corresponding to a de minimis or no dead zone), then proceed to block 116 (and the corresponding options). If in block 110, the ESC dead zone ratio is not below the dead zone threshold level, then proceed to block 128 and proceed as described above. If in block 114, the protection region coverage ratio determined to not be greater than the first protection region coverage ratio level (PRCRL1), then proceed to block 118 and proceed as described above; if the PRCR is not greater than PRCRL1, then determine the dead zone ratio, and based upon the dead zone ratio determine whether or not to change at least one parameter of the receiver system.

Analysis and design of an ESC system, particularly a receiver system, can be further automated. The ESC system designer can include a default increment for each receiver system parameter that can be changed. The default increment is the value by which the corresponding receiver system parameter can be increased or decreased. The ESC system designer can also define the maximum number of iterations performed automatically to optimize receiver system deployment to prevent the methods from entering an endless loop due to a lack of convergence. Finally, the ESC system designer, the analysis system, and/or an external database can provide candidate geographic locations.

FIG. 1E illustrates a flow diagram of one embodiment of a method 100E for automatically determining recommendations and classifications for receiver system parameters. In block 152, receive receiver system parameters and configuration data. In block 154, model dead zone area and protection region coverage, e.g., using the methods described above with respect to FIGS. 1A and 1D (excluding repeating block 102). Whether the method of FIG. 1A or FIG. 1D is used may be selected based upon population density in the corresponding ROI, as discussed elsewhere herein.

In block 156, determine whether an interactive or automated mode was selected, e.g., by the ESC system designer.

The interactive mode is a semi-manual mode in which an analysis method, e.g., methods 100A or 100C as described elsewhere herein, are performed once. The automated mode attempts to repetitively perform the interactive mode in an automated fashion to obtain enhanced or optimized receiver system parameters. Optionally, the configuration data may also include an automated/interactive mode selection, and the determination of block 156 can be ascertained based upon such data; alternatively, an analysis system user can enter such mode selection data.

If interactive mode was determined to be selected in block 156, then in block 158, log at least one of the recommendation(s) and the classification generated by the single performance of the analysis method. Optionally, notify the ESC system designer of the classification. Optionally, if the automated mode is used, each new at least one of the recommendation(s) and the classification replaces any previously determined at least one of the recommendation(s) and the classification. Optionally, provide to the ESC system designer, e.g., the last, at least one of the recommendations for and classifications of the receiver system.

If the automated mode was determined to be selected in block 156, then in block 160, determine if the receiver system parameters were classified as "Good" by the analysis method. "Good" means that the receiver system parameters are satisfactory because the receiver system implemented with the receiver system parameters has a dead zone ratio less than the user defined dead zone ratio threshold level and the protection region coverage ratio is greater than the user defined PRCR threshold level. If the receiver system is determined to be classified as good, then proceed to block 158 and its options as described above. If the receiver system is determined not to be classified as "Good", then in block 162 increment the number of iterations performed, e.g., by 1 or another amount. In block 164, determine if the number of iterations performed is greater than or equal to a maximum number of iterations. If the iterations performed is greater than or equal to the maximum number of iterations, then proceed to block 158 and its options described above.

If the number of iterations performed is less than the maximum number of iterations, then in block 166 update the receiver system parameter(s) based upon recommendations of the method used and a corresponding receiver system parameter increment. Then, return to block 154. In blocks 124 and 136 in FIGS. 1A and 1D, more than one receiver system parameter can be changed: e.g., antenna location, antenna height, and/or front end gain.

Optionally, when faced with the option of changing more than one parameter and due to ease of nature of relative changes, change front end gain before antenna height, and change either antenna height or front end gain before changing antenna location. Thus, avoid moving antenna location until other radio parameters recommended for change can no longer be changed, e.g., because they are at a maximum or minimum level. If antenna location must be changed, then move the antenna location to the nearest or one of the candidate receiver system locations, e.g., that is a tower, so as to for example maintain satisfactory coverage of the corresponding protection region.

Figure 2:
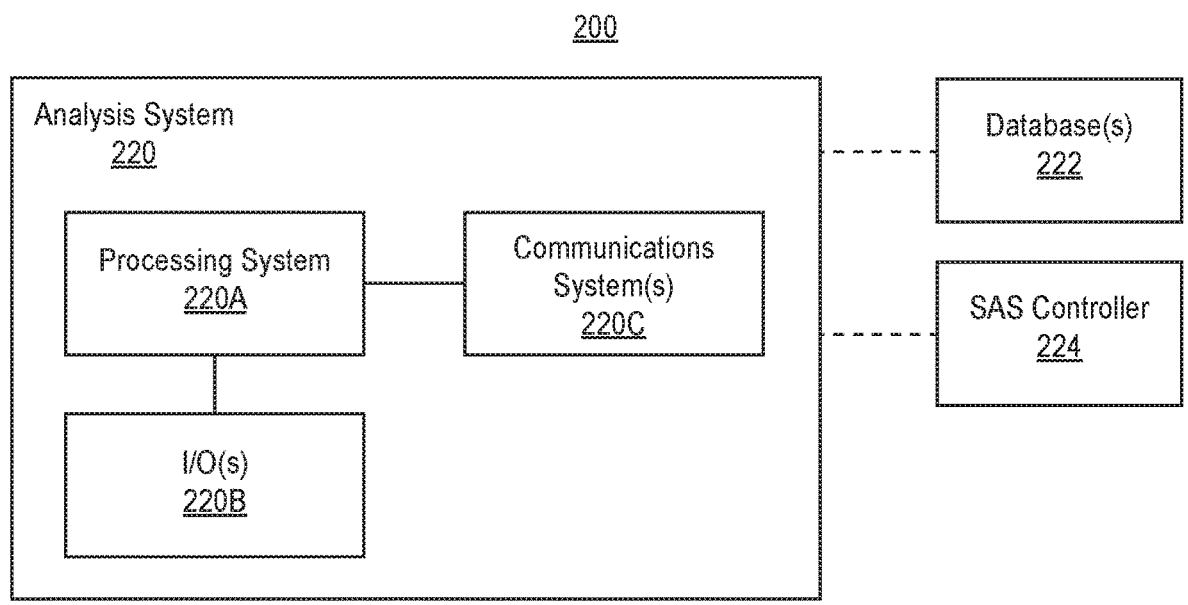
FIG. 2 illustrates a block diagram of one embodiment of an analysis system.

FIG. 2 illustrates a block diagram of one embodiment of an analysis system (or analysis circuitry) 200. The illustrated analysis system 200 comprises a processing system (or processing circuitry) 220A communicatively coupled to at least one input/output device (I/O(s)) 220B. Optionally, the processing circuitry 220A is also coupled to at least one communications system (communications system(s) or communications circuitry) 220C.

The processing system 220A is configured to store and execute the analysis methodology performed above. The processing system 220A also configured to store and utilize the configuration data when executing the analysis methodology. The processing system 220A may be a state machine or a neural network, and for example may comprise at least one processor circuit coupled to at least one memory circuit.

The communications system 220C facilitates communications between the processing circuitry 220A and external components, e.g., at least one external database (external database(s)) 222 and/or at least one external analysis system (external analysis system(s)) 224. Such external components will be subsequently discussed. The communications system 220C comprises communications circuitry such as Internet modem circuitry and/or radio circuitry.

In one embodiment, the external analysis system(s) 224 may include a SAS controller. The SAS controller may be used to perform analysis, e.g., IAP and/or path loss analysis, using data provided from the processing system 220A and providing resulting data to the processing system 220A.

Additionally or alternatively, the at least one communications systems 220C can be used to communicatively couple remote user(s) to the processing system 220A; in such an event, the processing system 220A may not require the I/O(s) 220B. Such remote user(s) are located at a distance from the processing system 220A, and may be person(s) and/or computer system(s) and/or other machine(s).

The I/O(s) 220B are man machine interfaces that a user, such as a person, to interact with the shared spectra radio network planning system 200. The I/O(s) 220B may comprise a keyboard, a mouse, a joystick, a microphone and/or a voice recognition system, a touch screen display, a non-touch screen display (e.g., an LCD or OLED display), and/or at least one audio speaker and/or a voice synthesizer.

The database(s) 222 may be used store data used to perform the modelling and/or data generated by the modelling. Such data may include population data for geographic regions stored in database(s) at the U.S. Census Bureau, geographic morphology data stored in database(s) at the U.S. Geological Survey, map data stored in database(s) at map data providers such as Google, and/or data about existing and/or planned radio networks, incumbent user systems, and priority access licensee radios in or near a geographic region of impact and using the shared spectra being modelled which may be stored in database(s) at the U.S. Federal Communications Commission, National Telecommunications and Information Administration, and/or shared access system(s); for example, such shared access system(s) may already control radios utilizing the shared spectra and located in the geographic region being modelled. Some data in the database(s) 222 may be entered by the user or may be implemented by the system as described elsewhere herein. Data used to perform the modelling, includes the population data for geographic regions, The processor circuit(s) described herein may include one or more microprocessors, microcontrollers, digital signal processing (DSP) elements, application-specific integrated circuits (ASICs), and/or field programmable gate arrays (FPGAs). In this exemplary embodiment, each processor circuit includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuit(s) described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium and executed by the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

EXEMPLARY EMBODIMENTS

Example 1 includes a method, comprising: receiving parameter data of a receiver system and configuration data, where the configuration data comprises data, other than receiver system parameter data, configured to be used to model deployment of receiver system; determining prospective locations of radios controlled by a shared access system and in a region of impact; determining at least one radio transmit power level; determining a dead zone ratio; and based upon at least one of a protection region coverage ratio (PRCR) and the dead zone ratio, recommending whether or not to change at least one parameter of the receiver system.

Example 2 includes the method of Example 1, wherein, based upon the at least one of the PRCR and the dead zone ratio, recommending whether or not to change the at least one parameter of the receiver system comprises: determining if the dead zone ratio is less than a dead zone threshold level; upon determining that the dead zone ratio is less than the dead zone threshold level, then determining the PRCR; determining if the PRCR is greater than a first protection region coverage ratio level (PRCRL1); upon determining that the PRCR is greater than the PRCRL1, then recommending no changes to the receiver system parameters; upon determining that the PRCR is not greater than the PRCRL1, then determining if the PRCR is greater than a second protection region coverage ratio level (PRCRL2), where the PRCRL2 is less than the PRCRL1; upon determining that the PRCR is greater than the PRCRL2, then recommending increasing receiver system front end gain; upon determining that the PRCR is not greater than the PRCRL2, then recommending changing at least one receiver system parameter; upon determining that the dead zone ratio is not less than the dead zone threshold level, then determining if any radios are in a line of sight (LOS) of a main beam of an antenna of the receiver system; upon determining that at least one radio is in the LOS of the main beam of the antenna of the receiver system, then recommending changing antenna azimuth; upon determining that no radio is in the LOS of the main beam of the antenna of the receiver system, then determining if terrain around the antenna of the receiver system is flat; upon determining that terrain around the antenna system is flat, then recommending reducing receiver system front end gain; and upon determining that the terrain around the antenna system is not flat, then recommending reducing at least one of receiver system antenna height and receiver system front end gain; wherein the receiver system parameters comprise receiver system azimuth, receiver system location, receiver system antenna height, and receiver system front end gain.

Example 3 includes the method of Example 2, wherein recommending no changes to the receiver system parameters further comprises classifying the receiver system parameters as satisfactory; wherein recommending changing the at least one receiver system parameter further comprises classifying the receiver system parameters as unsatisfactory; wherein recommending reducing the at least one of receiver system antenna height and receiver system front end gain further comprises classifying the receiver system parameters as unsatisfactory; wherein recommending changing the antenna azimuth further comprises classifying the receiver system parameters as can be improved; and wherein recommending reducing the receiver system front end gain further comprises classifying the receiver system parameters as can be improved.

Example 4 includes the method of any of Examples 1-3, wherein the configuration data comprises at least one of: at least one candidate geographic location, at least one candidate receiver system location, a dead zone threshold level, a first protection region threshold level, a second protection region threshold level, at least one population density, a market penetration factor, a channel factor, region(s) of impact, an aggregate interference power spectral density threshold at a receiver system from radios, a confidence level, a radiated peak power spectral density level, a dead zone threshold level, a first protection region coverage ratio level, a second protection region coverage ratio level, a threshold flatness level, a population density threshold level, at least one minimum inter-radio distance, at least one number of users per radio, population data for at least one geographic region, at least one receiver system parameter increment, a first threshold transmit power spectral density level, and a second threshold transmit power spectral density level.

Example 5 includes the method of any of Examples 1-4, wherein determining the prospective locations of the radios controlled by the shared access system and in the region of impact further comprises: obtaining population data for at least one geographic region; determining a number of radios per channel in the region of impact; and determining a number of candidate geographic locations.

Example 6 includes the method of any of Example 5, wherein determining the number of candidate geographic locations comprises determining ceil(Deployment Scaling Factor*$R_i$*$N_i$), where the Deployment Scaling Factor is a scaling factor whose unit is candidate geographic locations per radio and is a positive number constrained by the minimum inter-radio distance, $R_i$ is a unitless scaling factor for an $i^{th}$ geographic region and relates to related to candidate radio locations, and $N_i$ is a number of radios per channel in the $i^{th}$ geographic region.

Example 7 includes the method of any of Examples 5-6, further comprising determining $R_i$ by dividing (a) an cardinal value of a union of a set of candidate radio locations within the $i^{th}$ geographic region within a first ROI of a first receiver system of an Environmental Sensing Capability (ESC) system and a set of candidate radio locations within the $i^{th}$ geographic region of a second ROI of the first receiver system by (b) the total number of candidate radio locations within the $i^{th}$ geographic region.

Example 8 includes the method of any of Examples 1-7, further comprising: determining whether an automated mode was selected; upon determining that the automated mode was selected, then determining whether the receiver system parameters were classified as satisfactory; upon determining that the receiver system parameters were not classified as satisfactory, then incrementing a number of iterations; determine if the number of iterations performed is greater than a maximum number of iterations; and upon determining that the number of iterations performed is not greater than a maximum number of iterations, then proceed to the determining prospective locations of the radios controlled by the shared access system in the region of impact.

Example 9 includes a system, comprising: processing circuitry configured to: receive parameter data of a receiver system and configuration data, where the configuration data comprises data, other than receiver system parameter data, configured to be used to model deployment of receiver system; determine prospective locations of radios controlled by a shared access system and in a region of impact; determine at least one radio transmit power level; and determine a dead zone ratio.

Example 10 includes the system of Example 9, wherein, based upon the at least one of the PRCR and the dead zone ratio, recommending whether or not to change the at least one parameter of the receiver system comprises: determine if the dead zone ratio is less than a dead zone threshold level; upon determining that the dead zone ratio is less than the dead zone threshold level, then determine the PRCR; determine if the PRCR is greater than a first protection region coverage ratio level (PRCRL1); upon determining that the PRCR is greater than the PRCRL1, then recommend no changes to the receiver system parameters; upon determining that the PRCR is not greater than the PCRL1, then determine if the PRCR is greater than a second protection region coverage ratio level (PRCRL2), where the PCRL2 is less than the PRCRL1; upon determining that the PRCR is greater than the PRCRL2, then recommend increasing receiver system front end gain; upon determining that the PRCR is not greater than the PRCRL2, then recommend changing at least one receiver system parameter; upon determining that the dead zone ratio is not less than the dead zone threshold level, then determine if any radios are in a line of sight (LOS) of a main beam of an antenna of the receiver system; upon determining that at least one radio is in the LOS of the main beam of the antenna of the receiver system, then recommend changing antenna azimuth; upon determining that no radio is in the LOS of the main beam of the antenna of the receiver system, then determine if terrain around the antenna of the receiver system is flat; upon determining that terrain around the antenna system is flat, then recommend reducing receiver system front end gain; and upon determining that the terrain around the antenna system is not flat, then recommend reducing at least one of receiver system antenna height and receiver system front end gain; wherein the receiver system parameters comprise receiver system azimuth, receiver system location, receiver system antenna height, and receiver system front end gain.

Example 11 includes the system of any of Examples 9-10, wherein recommend no changes to the receiver system parameters further comprises classify the receiver system parameters as satisfactory; wherein recommend changing the at least one receiver system parameter further comprises classify the receiver system parameters as unsatisfactory; wherein recommend reducing the at least one of receiver system antenna height and receiver system front end gain further comprises classify the receiver system parameters as unsatisfactory; wherein recommend changing the antenna azimuth further comprises classify the receiver system parameters as can be improved; and wherein recommend reducing the receiver system front end gain further comprises classify the receiver system parameters as can be improved.

Example 12 includes the system of any of Examples 9-11, wherein the configuration data comprises at least one of: at least one candidate geographic location, at least one candidate receiver system location, a dead zone threshold level, a first protection region threshold level, a second protection region threshold level, at least one population density, a market penetration factor, a channel factor, region(s) of impact, an aggregate interference power spectral density threshold at a receiver system from radios, a confidence level, a radiated peak power spectral density level, a dead zone threshold level, a first protection region coverage ratio level, a second protection region coverage ratio level, a threshold flatness level, a population density threshold level, at least one minimum inter-radio distance, at least one number of users per radio, population data for at least one geographic region, at least one receiver system parameter increment, a first threshold transmit power spectral density level, and a second threshold transmit power spectral density level.

Example 13 includes the system of any of Examples 9-12, wherein determine the prospective locations of the radios controlled by the shared access system in the region of impact further comprises: obtain population data for at least one geographic region; determine a number of radios per channel in the region of impact; and determine a number of candidate geographic locations.

Example 14 includes the system of Example 13, wherein determine the number of candidate geographic locations comprises determine ceil(Deployment Scaling Factor*$R_i$*$N_i$), where the Deployment Scaling Factor is a scaling factor whose unit is candidate geographic locations per radio and is a positive number constrained by the minimum inter-radio distance, $R_i$ is a unitless scaling factor for an $i^{th}$ geographic region and relates to related to candidate radio locations, and $N_i$ is a number of radios per channel in the $i^{th}$ geographic region.

Example 15 includes the system of any of Examples 13-14, wherein the processing circuitry is further configured to determine $R_i$ by dividing (a) an cardinal value of a union of a set of candidate radio locations within the $i^{th}$ geographic region within a first ROI of a first receiver system of an Environmental Sensing Capability (ESC) system and a set of candidate radio locations within the $i^{th}$ geographic region of a second ROI of the first receiver system by (b) the total number of candidate radio locations within the $i^{th}$ geographic region.

Example 16 includes the system of any of Examples 9-15, wherein the processing circuitry is further configured to: determine whether an automated mode was selected; upon determining that an automated mode was selected, then determine whether the receiver system parameters were classified as satisfactory; upon determining that the receiver system parameters were not classified as satisfactory, then increment a number of iterations; determine if the number of iterations performed is greater than a maximum number of iterations; and upon determining that the number of iterations performed is not greater than a maximum number of iterations, then proceed to the determine prospective locations of the radios controlled by the shared access system in the region of impact.

Example 17 includes the system of any of Examples 9-16, wherein the processing circuitry is coupled to at least one of: at least one communications system and at least one input/output device.

Example 18 includes a method, comprising: receiving parameter data of a receiver system and configuration data, where the configuration data comprises data, other than receiver system parameter data, configured to be used to model deployment of receiver system; determining a protection region coverage ratio (PRCR); and based upon at least one of the PRCR and a dead zone ratio, recommending whether or not to change at least one parameter of the receiver system.

Example 19 includes the method of Example 18, wherein, based upon the at least one of the PRCR and the dead zone ratio, recommending whether or not to change the at least one parameter of the receiver system comprises: determining if the PRCR is greater than a first protection region coverage ratio level (PRCRL1); upon determining that the PRCR is greater than the PCRL1, then: determining prospective locations of radios controlled by a shared access system and in the region of impact; determining at least one radio transmit power level; determining a dead zone ratio; determining if the dead zone ratio is less than a dead zone threshold level; upon determining that the dead zone ratio is less than the dead zone threshold level, then recommending no changes to receiver system parameters; upon determining that the dead zone ratio is not less than the dead zone threshold level, then determining if any radios are in a line of sight (LOS) of a main beam of an antenna of the receiver system; upon determining that any radios are in the LOS of the main beam of the antenna of the receiver system, then recommending changing antenna azimuth; upon determining that no radios are in the LOS of the main beam of the antenna of the receiver system, then determining if terrain around the antenna of the receiver system is flat; upon determining that the terrain around the antenna system is flat, then recommending reducing receiver system front end gain; and upon determining that the terrain around the antenna system is not flat, then recommending reducing at least one of receiver system antenna height and receiver system front end gain; upon determining that the PRCR is not greater than the PRCRL1, then determining if the PRCR is greater than a second protection region coverage ratio level (PRCRL2), where the PCRL2 is less than the PRCRL1; upon determining that the PRCR is greater than the PRCRL2, then recommending increasing receiver system front end gain; and upon determining that the PRCR is not greater than the PRCRL2, then recommending changing at least one receiver system parameter.

Example 20 includes the method of any of Examples 18-19, wherein receiver system parameters comprise receiver system azimuth, receiver system location, receiver system antenna height, and receiver system front end gain; wherein changing at least one receiver parameter comprises changing at least one of receiver system location, receiver system antenna height, and receiver system front end gain; wherein recommending no changes to the receiver system parameters further comprises classifying the receiver system parameters as satisfactory; wherein recommending changing at least one receiver system parameter further comprises classifying the receiver system parameters as unsatisfactory; wherein recommending reducing at least one of receiver system antenna height and receiver system front end gain further comprises classifying the receiver system parameters as unsatisfactory; wherein recommending changing antenna azimuth further comprises classifying the receiver system parameters as can be improved; and wherein recommending reducing receiver system front end gain further comprises classifying the receiver system parameters as can be improved.

Example 21 includes the method of any of Examples 18-20, wherein the configuration data comprises at least one of: at least one candidate geographic location, at least one candidate receiver system location, a dead zone threshold level, a first protection region threshold level, a second protection region threshold level, at least one population density, a market penetration factor, a channel factor, region (s) of impact, an aggregate interference power spectral density threshold at a receiver system from radios, a confidence level, a radiated peak power spectral density level, a dead zone threshold level, a first protection region coverage ratio level, a second protection region coverage ratio level, a threshold flatness level, a population density threshold level, at least one minimum inter-radio distance, at least one number of users per radio, population data for at least one geographic region, at least one receiver system parameter increment, a first threshold transmit power spectral density level, and a second threshold transmit power spectral density level.

Example 22 includes the method of any of Examples 18-21, wherein determining the prospective locations of the radios controlled by the shared access system and in the region of impact further comprises: obtaining population data for at least one geographic region; determining a number of radios per channel in the region of impact; and determining a number of candidate geographic locations.

Example 23 includes the method of Example 22, wherein determining a number of candidate geographic locations comprises determining ceil(Deployment Scaling Factor*$R_i$*$N_i$), where the Deployment Scaling Factor is a scaling factor whose unit is candidate geographic locations per radio and is a positive number constrained by the minimum inter-radio distance, $R_i$ is a unitless scaling factor for an $i^{th}$ geographic region and relates to related to candidate radio locations, and $N_i$ is a number of radios per channel in the $i^{th}$ geographic region.

Example 24 includes the method of any of Examples 22-23, further comprising determining $R_i$ by dividing (a) an cardinal value of a union of a set of candidate radio locations within the $i^{th}$ geographic region within a first ROI of a first receiver system of an Environmental Sensing Capability (ESC) system and a set of candidate radio locations within the $i^{th}$ geographic region of a second ROI of the first receiver system by (b) the total number of candidate radio locations within the $i^{th}$ geographic region.

Example 25 includes the method of any of Examples 18-24, further comprising: determining whether an automated mode was selected; upon determining that an automated mode was selected, then determining whether the receiver system parameters were classified as satisfactory; upon determining that the receiver system parameters were not classified as satisfactory, then incrementing a number of iterations; determine if the number of iterations performed is greater than a maximum number of iterations; and upon determining that the number of iterations performed is not greater than a maximum number of iterations, then proceed to the determining prospective locations of the radios controlled by the shared access system in the region of impact.

Example 26 includes a system, comprising: processing circuitry configured to: receive configuration data and parameter data of a receiver system, where the configuration data comprises data, other than receiver system parameter data, configured to be used to model deployment of receiver system; determine a protection region coverage ratio (PRCR); and based upon at least one of the PRCR and a dead zone ratio, recommending whether or not to change at least one parameter of the receiver system.

Example 27 includes the system of Example 26, wherein, based upon the at least one of the PRCR and the dead zone ratio, recommending whether or not to change the at least one parameter of the receiver system comprises: determine if the PRCR is greater than a first protection region coverage ratio level (PRCRL1); upon determining that the PRCR is greater than the PRCRL1, then determine prospective locations of radios controlled by a shared access system in the region of impact; determine at least one radio transmit power level; determine a dead zone ratio; determine if the dead zone ratio is less than a dead zone threshold level; upon determining that the dead zone ratio is less than the dead zone threshold level, then recommend no changes to receiver system parameters; upon determining that the dead zone ratio is not less than the dead zone threshold level, then determine if any radios are in a line of sight (LOS) of a main beam of an antenna of the receiver system; upon determining that any radios are in the LOS of the main beam of the antenna of the receiver system, then recommend changing antenna azimuth; upon determining that no radios are in the LOS of the main beam of the antenna of the receiver system, then determine if terrain around the antenna of the receiver system is flat; upon determining that terrain around the antenna system is flat, then recommend reducing receiver system front end gain; and upon determining that the terrain around the antenna system is not flat, then recommend reducing at least one of receiver system antenna height and receiver system front end gain; upon determining that the PRCR is not greater than the PRCRL1, then determine if the PRCR is greater than a second protection region coverage ratio level (PRCRL2), where PRCRL2 is less than the PRCRL1; upon determining that the PRCR is greater than the PRCRL2, then recommend increasing receiver system front end gain; and upon determining that the PRCR is not greater than the PRCRL2, then recommend changing at least one receiver system parameter.

Example 28 includes the system of any of Examples 26-27, wherein receiver system parameters comprise receiver system azimuth, receiver system location, receiver system antenna height, and receiver system front end gain; wherein change at least one receiver parameter comprises change at least one of receiver system location, receiver system antenna height, and receiver system front end gain; wherein recommend no changes to the receiver system parameters further comprises classify the receiver system parameters as satisfactory; wherein recommending change at least one receiver system parameter further comprises classify the receiver system parameters as unsatisfactory; wherein recommend reducing at least one of receiver system antenna height and receiver system front end gain further comprises classify the receiver system parameters as unsatisfactory; wherein recommend changing antenna azimuth further comprises classify the receiver system parameters as can be improved; and wherein recommend reducing receiver system front end gain further comprises classify the receiver system parameters as can be improved.

Example 29 includes the system of any of Examples 26-28, wherein the configuration data comprises at least one of: at least one candidate geographic location, at least one candidate receiver system location, a dead zone threshold level, a first protection region threshold level, a second protection region threshold level, at least one population density, a market penetration factor, a channel factor, region (s) of impact, an aggregate interference power spectral density threshold at a receiver system from radios, a confidence level, a radiated peak power spectral density level, a dead zone threshold level, a first protection region coverage ratio level, a second protection region coverage ratio level, a threshold flatness level, a population density threshold level, at least one minimum inter-radio distance, at least one number of users per radio, population data for at least one geographic region, at least one receiver system parameter increment, a first threshold transmit power spectral density level, and a second threshold transmit power spectral density level.

Example 30 includes the system of Example 27, wherein determine the prospective locations of the radios controlled by the shared access system and in the region of impact further comprises: obtain population data for at least one geographic region; determine a number of radios per channel in the region of impact; and determine a number of candidate geographic locations.

Example 31 includes the system of any of Example 27-30, wherein determine the number of candidate geographic locations comprises determine ceil(Deployment Scaling Factor*$R_i$*$N_i$), where the Deployment Scaling Factor is a scaling factor whose unit is candidate geographic locations per radio and is a positive number constrained by the minimum inter-radio distance, $R_i$ is a unitless scaling factor for an $i^{th}$ geographic region and relates to related to candidate radio locations, and $N_i$ is a number of radios per channel in the $i^{th}$ geographic region.

Example 32 includes the system of any of Examples 27-31, wherein the processing circuitry is further configured to determine $R_i$ by dividing (a) an cardinal value of a union of a set of candidate radio locations within the $i^{th}$ geographic region within a first ROI of a first receiver system of an Environmental Sensing Capability (ESC) system and a set of candidate radio locations within the $i^{th}$ geographic region of a second ROI of the first receiver system by (b) the total number of candidate radio locations within the $i^{th}$ geographic region.

Example 33 includes the system of any of Examples 26-32, wherein the processing circuitry is further configured to: determine whether an automated mode was selected; upon determining that an automated mode was selected, then determine whether the receiver system parameters were classified as satisfactory; upon determining that the receiver system parameters were not classified as unsatisfactory, then increment a number of iterations; determine if the number of iterations performed is greater than a maximum number of iterations; and upon determining that the number of iterations performed is not greater than a maximum number of iterations, then proceed to the determine prospective locations of the radios controlled by the shared access system in the region of impact.

Example 34 includes the system of any of Examples 26-33, wherein the processing circuitry is coupled to at least one of: at least one communications system and at least one input/output device.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method, comprising:
    receiving parameter data of a receiver system of an environmental sensing capability (ESC) system and configuration data, wherein the configuration data comprises data, other than receiver system parameter data, including a region of impact (ROI) around the receiver system, wherein the ESC system is configured to detect transmissions of an incumbent user in shared frequency spectrum in a dynamic protection area;
    using the ROI, determining prospective locations, in the ROI, of radios configured to transmit in the shared frequency spectrum, and a number of such radios;
    using the determined prospective locations, determining a first radio transmit power level, for a radio in each determined prospective location, by allocating a transmit power level to each radio in a neighborhood area around the receiver system so that an aggregate interference at the receiver system from each radio in the neighborhood area does not exceed an interference threshold level;
    identifying any radio whose first transmit power level is less than a minimum power threshold level for a category type of a corresponding radio;
    determining a second radio transmit power level, for the radio in each determined prospective location except for any identified radio, by allocating another transmit power level to each radio in the neighborhood area around the receiver system so that the aggregate interference at the receiver system from each radio in the neighborhood area does not exceed the interference threshold level;
    determining a dead zone ratio of identified radios with respect to a number of possible radios in the shared frequency spectrum and in the ROI; and
    based upon at least one of a protection region coverage ratio (PRCR) and the dead zone ratio, recommending changing at least one parameter of the receiver system, wherein the PRCR is a ratio of (a) a portion of a protection region in which the receiver system can detect a signal above a threshold power level with respect to (b) a total area of the protection region, and wherein the protection region is an area where aggregate interference must be below the interference threshold level.

2. The method of claim 1, wherein, based upon the at least one of the PRCR and the dead zone ratio, recommending changing the at least one parameter of the receiver system comprises:
    determining if the dead zone ratio is less than a dead zone threshold level;
    determining that the dead zone ratio is less than the dead zone threshold level, then determining the PRCR;
    determining if the PRCR is greater than a first protection region coverage ratio level (PRCRL1);
    determining that the PRCR is not greater than the PRCRL1, then determining if the PRCR is greater than a second protection region coverage ratio level (PRCRL2), wherein the PRCRL2 is less than the PRCRL1;
    determining that the PRCR is greater than the PRCRL2, then recommending increasing receiver system front end gain;
    determining that the PRCR is not greater than the PRCRL2, then recommending changing at least one receiver system parameter;
    determining that the dead zone ratio is not less than the dead zone threshold level, then determining if any radios are in a line of sight (LOS) of a main beam of an antenna of the receiver system;
    determining that at least one radio is in the LOS of the main beam of the antenna of the receiver system, then recommending changing antenna azimuth;
    determining that no radio is in the LOS of the main beam of the antenna of the receiver system, then determining if terrain around the antenna of the receiver system is flat;
    determining that terrain around the antenna is flat, then recommending reducing receiver system front end gain; and
    determining that the terrain around the antenna is not flat, then recommending reducing at least one of receiver system antenna height and receiver system front end gain;
    wherein receiver system parameters comprise receiver system azimuth, receiver system location, receiver system antenna height, and receiver system front end gain.

3. The method of claim 1, wherein the configuration data further comprises at least one of: at least one candidate geographic location, at least one candidate receiver system location, a dead zone threshold level, a first protection region threshold level, a second protection region threshold level, at least one population density, a market penetration factor, a channel factor, an aggregate interference power spectral density threshold at a receiver system from radios, a confidence level, a radiated peak power spectral density level, a dead zone threshold level, a first protection region coverage ratio level, a second protection region coverage ratio level, a threshold flatness level, a population density threshold level, at least one minimum inter-radio distance, at least one number of users per radio, population data for at least one geographic region, at least one receiver system parameter increment, a first threshold transmit power spectral density level, and a second threshold transmit power spectral density level.

4. The method of claim 1, wherein determining the prospective locations, in the ROI, comprises:
    obtaining population data for at least one geographic region;
    determining a number of radios per channel in the region of impact; and
    determining a number of candidate geographic locations.

5. The method of claim 4, wherein determining the number of candidate geographic locations comprises determining ceil(Deployment Scaling Factor*$R_i$*$N_i$), wherein the Deployment Scaling Factor is a scaling factor whose unit is candidate geographic locations per radio and is a positive number constrained by a minimum inter-radio distance, $R_i$ is a unitless scaling factor for an $i^{th}$ geographic region and relates to candidate radio locations, and $N_i$, is a number of radios per channel in the $i^{th}$ geographic region.

6. The method of claim 1, further comprising:
    determining whether an automated mode was selected;
    determining that the automated mode was selected, then determining whether the receiver system parameters were classified as satisfactory;
    determining that the receiver system parameters were not classified as satisfactory, then incrementing a number of iterations;
    determining if the number of iterations performed is greater than a maximum number of iterations; and
    determining that the number of iterations performed is not greater than a maximum number of iterations, then proceed to the determining prospective locations of the radios configured to transmit in the shared frequency spectrum in the region of impact.

\* \* \* \* \*